United States Patent
Pan

(10) Patent No.: US 8,139,284 B2
(45) Date of Patent: Mar. 20, 2012

(54) DIGITAL MICROMIRROR DEVICE HAVING WAVELENGTH-DEPENDENT MODULATION STRUCTURE AND METHOD OF MANUFACTURING THE SAME

(75) Inventor: Kun C. Pan, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 131 days.

(21) Appl. No.: 12/258,334

(22) Filed: Oct. 24, 2008

(65) Prior Publication Data

US 2010/0103498 A1    Apr. 29, 2010

(51) Int. Cl.
*G02B 26/00* (2006.01)
(52) U.S. Cl. .................... 359/291; 359/292
(58) Field of Classification Search .......... 359/290, 359/291, 292, 293, 295, 298, 223, 224, 214, 359/320, 322, 323, 324
See application file for complete search history.

(56) References Cited

U.S. PATENT DOCUMENTS

| | | | | |
|---|---|---|---|---|
| 6,147,806 A * | 11/2000 | Park et al. | ...... | 359/634 |
| 6,900,825 B2 * | 5/2005 | Kito | ...... | 347/239 |
| 6,943,950 B2 * | 9/2005 | Lee et al. | ...... | 359/571 |
| 7,158,279 B2 * | 1/2007 | Patel et al. | ...... | 359/291 |
| 7,171,068 B2 * | 1/2007 | Bartlett et al. | ...... | 385/17 |
| 7,460,293 B2 * | 12/2008 | Emery et al. | ...... | 359/293 |

* cited by examiner

*Primary Examiner* — Ricky Mack
*Assistant Examiner* — Tuyen Tra
(74) *Attorney, Agent, or Firm* — Warren L. Franz; Wade J. Brady, III; Frederick J. Telecky, Jr

(57) ABSTRACT

A digital micromirror device (DMD), a method of manufacturing the DMD and an optical processor incorporating a DMD. In one embodiment, the DMD includes: (1) a first group of micromirrors having a first modulation structure based on a first wavelength of light and a second group of micromirrors having a second modulation structure based on a second wavelength of light, the second wavelength differing from the first wavelength.

19 Claims, 7 Drawing Sheets

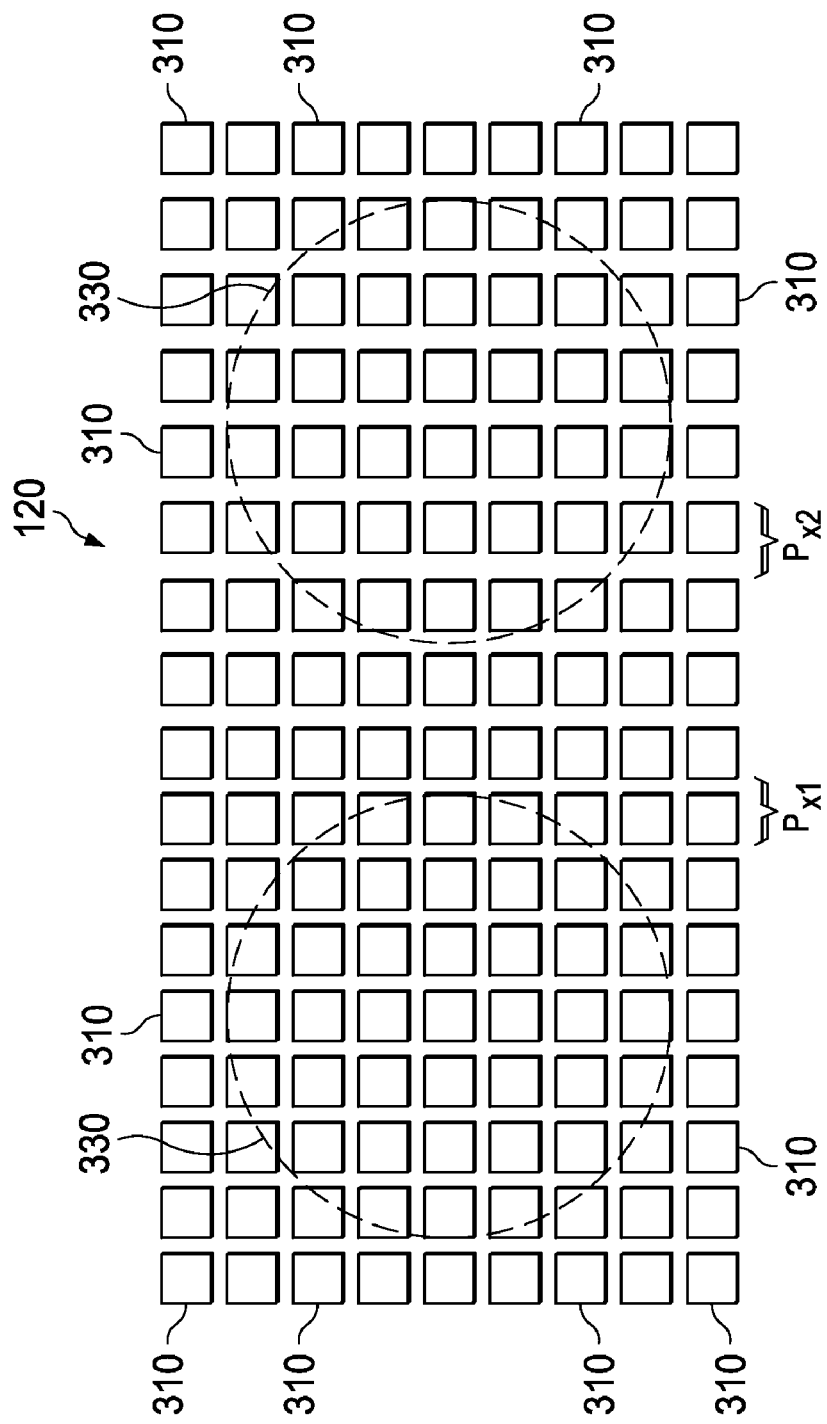

DIGITAL MICROMIRROR DEVICE HAVING WAVELENGTH-DEPENDENT MODULATION STRUCTURE AND METHOD OF MANUFACTURING THE SAME

TECHNICAL FIELD OF THE INVENTION

The invention is directed, in general, to a and, more specifically, to a digital micromirror device (DMD) having a wavelength-dependent modulation structure and a method of manufacturing such a DMD.

BACKGROUND OF THE INVENTION

Several significant applications exist in which light needs to be switched (turned on or off or routed), equalized (selectively attenuated to adjust relative amplitude) or otherwise processed as a function of wavelength (i.e., color). For example, add-drop multiplexers (ADMs) allow one or more wavelengths of light, each representing an optical channel, to be added or dropped from a wavelength-division-multiplex (WDM) "backbone" fiber. Optical equalizers attenuate certain wavelengths of light relative to others to balance signal strength or modify the "temperature" of "white" light. Color image (e.g., video) displays process colored light to form one or more images for the benefit of a viewer. Today's DMDs are capable of performing exceptionally well in these and other applications in which colored light is to be processed.

SUMMARY OF THE INVENTION

One aspect of the invention provides a DMD. In one embodiment, the DMD includes: (1) a first group of micromirrors having a first modulation structure based on a first wavelength of light and a second group of micromirrors having a second modulation structure based on a second wavelength of light, the second wavelength differing from the first wavelength.

Another aspect of the invention provides a method of manufacturing a DMD. In one embodiment, the method includes: (1) providing a substrate, (2) forming a modulation structure on the substrate, a first portion of the modulation structure being based on a first wavelength of light, a second portion of the modulation structure being based on a second wavelength of light, the second wavelength differing from the first wavelength and (3) creating micromirrors on the modulation structure, a first group of micromirrors associated with the first portion, a second group of micromirrors associated with the second portion.

Yet another aspect of the invention provides an optical processor. In one embodiment, the processor includes: (1) input optics configured to receive and spatially spread light as a function of wavelength, (2) a digital micromirror device configured to receive a first portion of the light at a first wavelength upon a first group of micromirrors having a first modulation structure based on the first wavelength and a second portion of the light at a second wavelength upon a second group of micromirrors having a second modulation structure based on the second wavelength, the second wavelength differing from the first wavelength and (3) output optics configured to receive at least some light reflected off the digital micromirror device.

BRIEF DESCRIPTION OF THE DRAWINGS

For a more complete understanding of the invention, reference is now made to the following descriptions taken in conjunction with the accompanying drawings, in which:

FIG. 9 is plan view of a portion of one embodiment of a DMD having a wavelength-independent modulation structure constructed according to the principles of the invention.

DETAILED DESCRIPTION

Figure 1:
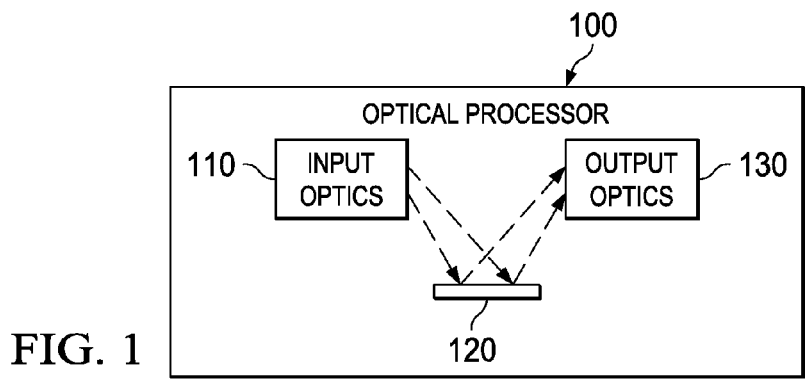
FIG. 1 is a block diagram of one embodiment of an optical processor within which a DMD constructed according to the principles of the invention may operate.

As stated above, DMDs are capable of performing exceptionally well in applications in which light needs to be switched, equalized or otherwise processed color-by-color (i.e., wavelength-by-wavelength). In such applications, multicolored light (e.g., a broad spectrum of "white" light or multiple, relatively narrow bands of light such as may be produced by corresponding lasers) is spread spatially as a function of wavelength and projected onto the mirrored face of a DMD as a line or a series of spots. Micromirrors that together form the mirrored face of the DMD are then tilted individually or in groups to modulate the reflection of the various wavelengths as needed to effect the switching, equalization or other processing.

The micromirrors of today's DMDs are offset from one another by a substantially uniform pitch and tilted over substantially the same angle. While this uniformity of micromirror pitch and tilt angle is logical and makes DMDs easier to manufacture, it has been found that the uniform pitch and tilt angle cause wavelength-dependent interference and concomitant amplitude variations in the light that is reflected off axis with respect to the face of the DMD. The magnitude of these variations may be such that they become problematic in particularly sensitive applications.

Insertion loss is an important consideration in evaluating the efficiency of any optical device, including DMDs. Ideally, a DMD should process input wavelengths of light such that every output wavelength retains as much amplitude (i.e., signal strength, power or energy) as possible. "Blazing" occurs when constructive interference, and therefore output amplitude, is at a maximum. Blazing occurs when wavefront phase differences are multiples of $2\pi$ radians and is reflection-angle dependent. On-axis reflections (those occurring at a reflection angle of 0) are axiomatically blazed. Therefore, a DMD exhibits the minimum insertion loss when it operates in a blazed condition not only at an on-axis reflection but also at the same off-axis reflection angle for every wavelength it is to process.

Unfortunately, as stated above, wavelength-dependent interference variations prevent today's DMDs from operating in a blazed condition for all relevant wavelengths at a given off-axis reflection angle. These variations worsen when reset signals perturb the micromirrors.

Various embodiments of a DMD having a wavelength-dependent modulation structure will be described herein. In some embodiments, the modulation structure varies in that the pitch that separates micromirrors from one another depends upon the wavelength of light the micromirrors are to reflect. In other embodiments, the modulation structure varies in that the tilt angle through which the micromirrors move depends upon the wavelength of light the micromirrors are to reflect. In yet other embodiments, both the pitch and the tilt angle depend upon the wavelength of light the micromirrors are to reflect.

In specific embodiments to be illustrated and described, wavelengths of light are assigned to different groups of micromirrors such that $\lambda/P$ is kept a constant, where $\lambda$ is the wavelength of the light projected on certain portions of the DMD and P is the pitch of the micromirrors in those portions. As a result, the blazed angle is the same for various wavelength signals. In other specific embodiments to be illustrated and described, wavelengths of light are assigned to different groups of micromirrors having different tilt angles. In certain of those latter embodiments, the blazed angle is different for different wavelengths, making the DMD particularly useful for display devices that use lasers as their light source.

FIG. 1 is a block diagram of one embodiment of an optical processor 100 within which a DMD constructed according to the principles of the invention may operate. In one embodiment, the optical processor 100 is at least part of an ADM. In another embodiment, the optical processor 100 is at least part of an optical equalizer. In yet another embodiment, the optical processor 100 is part of a color image display.

The optical processor 100 includes input optics 110. The input optics 110 are configured to receive and spatially spread light as a function of wavelength. The input optics 110 may be of any type, kind or number of optical elements, including waveguide, refractive, reflective and diffractive elements. The light may be received from a light source (not shown), which may be a bulb, a laser, an optical fiber or any other conventional or later-developed light source.

The optical processor 100 further includes a DMD 120. The DMD 120 is configured to receive the spatially spread light over at least a portion of its face. For example, the spatially spread light may take the form of a line (which is typically the case if the input light is a broad spectrum, or "white" light) or one or more spots (which is typically the case if the input light is a collection of one or more discrete wavelengths such as one or more lasers may produce).

Irrespective of whether the spatially spread light takes the form of a line or a plurality of spots, a first portion of the light at (e.g., centered about) a first wavelength is projected upon a first group of micromirrors (not shown in FIG. 1). The first group of micromirrors has a first modulation structure that is based (in terms of, e.g., a pitch, a tilt angle or some other structural characteristic) on the first wavelength. Likewise, a second portion of the light at (e.g., centered about) a second wavelength that is different from the first wavelength is projected upon a second group of micromirrors (not shown in FIG. 1). The second group of micromirrors has a second modulation structure that is based (in terms of, e.g., a pitch, a tilt angle or some other structural characteristic) on the second wavelength. The DMD 120 processes the first and second portions of the light, and perhaps third or more portions projected upon third or more groups of micromirrors (not shown) of the DMD 120. The processing may involve switching, attenuating, modulating or any other action that micromirrors may perform.

The optical processor 100 includes output optics 130. The output optics 130 are configured to receive at least some light reflected off the DMD. In one embodiment, the output optics 130 are configured to recombine the at least some light and steer it into an optical fiber. In another embodiment, the output optics 130 are configured to cause the at least some light to diverge to form an image. The output optics 130 may be of any type, kind or number of optical elements, including waveguide, refractive, reflective and diffractive elements. It should be noted that FIG. 1 is highly schematic and should not be taken to depict the relative locations of the input optics 110, DMD 120 and output optics 130. Nor should the unreferenced arrows indicate the extent to, or angle by, which light is projected on, or reflected from, the mirrored face of the DMD 120.

Figure 2:
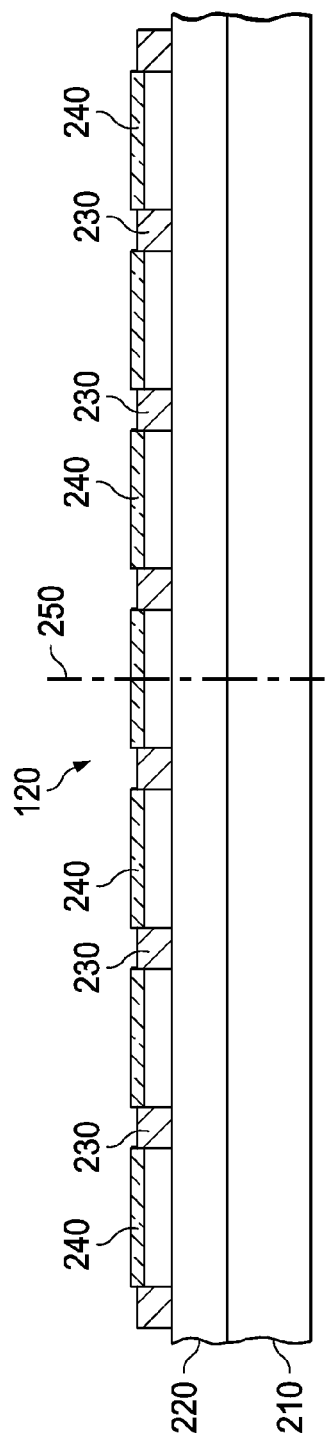
FIG. 2 is an elevational view of one embodiment of a portion of a DMD.

FIG. 2 is an elevational view of one embodiment of a portion of the DMD 120. The DMD 120 includes a substrate 210, which may be of any conventional or later-developed material. One or more active layers 220 overlie or are formed in the substrate 210. The active layers 220 contain at least some circuitry employed to cause micromirrors in the DMD 120 to tilt. Mirror supports (one of which being designated 230) extend upwardly, as shown, from the active layers 220 or the substrate 210. The mirror supports 230 are configured to support micromirrors (one of which being designated 240). Hinges or other structures couple the micromirrors 240 to the mirror supports 230, allowing the micromirrors to be tilted between one position (sometimes called an untilted state) to another position (sometimes called a tilted state). The tilted and untilted states may be regarded as OFF or ON states, depending upon the power-off condition of the DMD 120 and the arrangement of the DMD 120 relative to other optical elements.

The circuitry located in at least the active layers 220 may be configured to employ various conventional or later-discovered techniques to change the tilt of each micromirror 240 independently or in concert with other micromirrors 240. Those techniques not only include piezoelectric, electromagnetic and electromechanical actuation, but later-developed techniques as well. FIG. 2 also shows the axis 250 of the DMD 120, which is a line normal to the plane of the face of the DMD 120.

Figure 3:
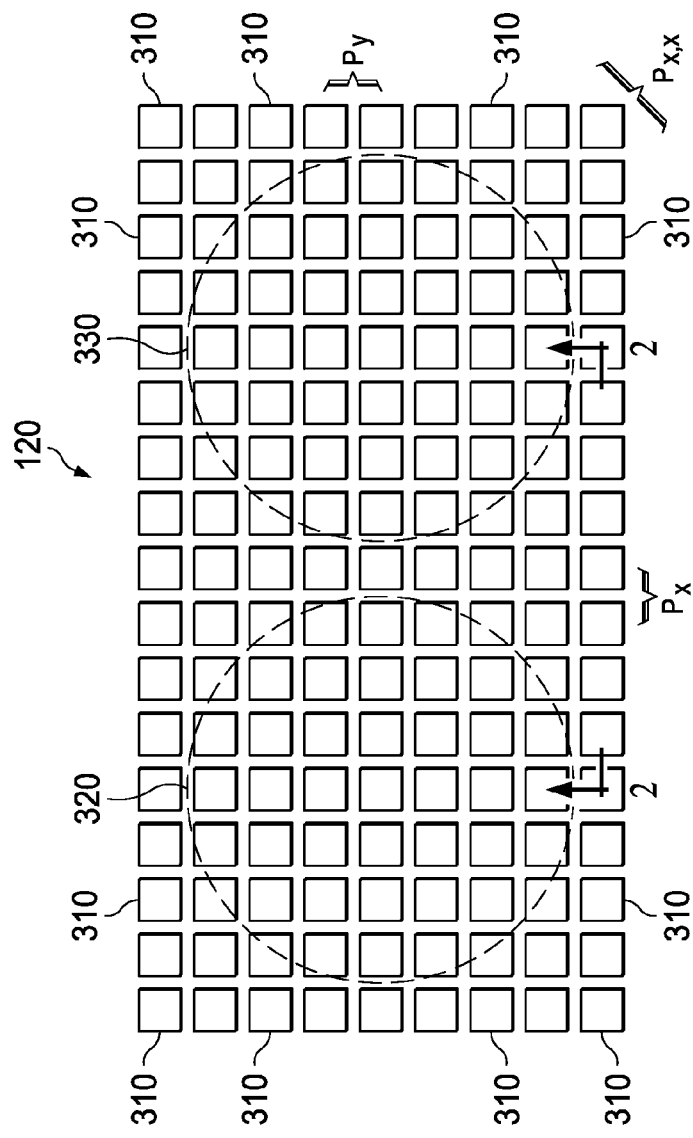
FIG. 3 is a plan view of a portion of a DMD.

FIG. 3 is a plan view of a portion of the DMD 120, showing mirrored faces (one of which being designated 310) of micromirrors that make up the face of the DMD 120. As stated above, a first portion of the light at (e.g., centered about) a first wavelength is projected upon a first group 320 of micromirrors. The first group 320 is indicated as being generally circular, but this certainly need not be the case. The first group 320 of micromirrors has a first modulation structure that is based (in terms of, e.g., a pitch, a tilt angle or some other structural characteristic) on the first wavelength. Likewise, a second portion of the light at (e.g., centered about) a second wavelength that is different from the first wavelength is projected upon a second group 330 of micromirrors. Like the first group 320, the second group 330 is indicated as being generally circular, but this certainly need not be the case.

FIG. 3 indicates various pitches P that the DMD 120 may have. In the context of this discussion, the pitch P is the distance on center between adjacent micromirrors taken in a direction normal to the axis of tilt and parallel to the face of the DMD 120. In the particular view and orientation of FIG. 3, the pitch $P_x$ is appropriate if the axis of tilt is vertical; the pitch $P_y$ is appropriate if the axis of tilt is horizontal; and the pitch $P_{x,y}$ is appropriate if the axis of tilt is diagonal, top left to bottom right. It will be apparent to those skilled in the pertinent art that many other tilt axes and corresponding pitches are possible.

Figure 4A:
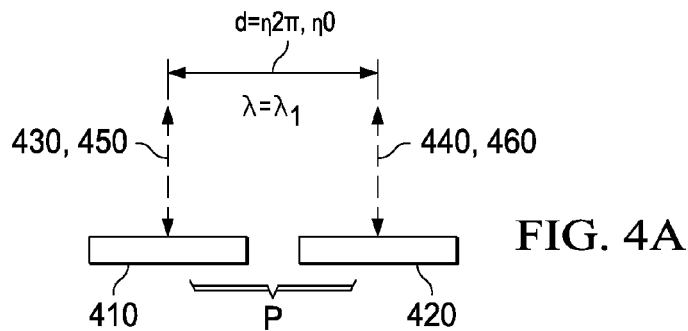
FIGS. 4A and 4B respectively illustrate a pair of mirrors in the DMD of FIGS. 2 and 3 in untilted and tilted states reflecting light of a first wavelength.
Figure 4B:
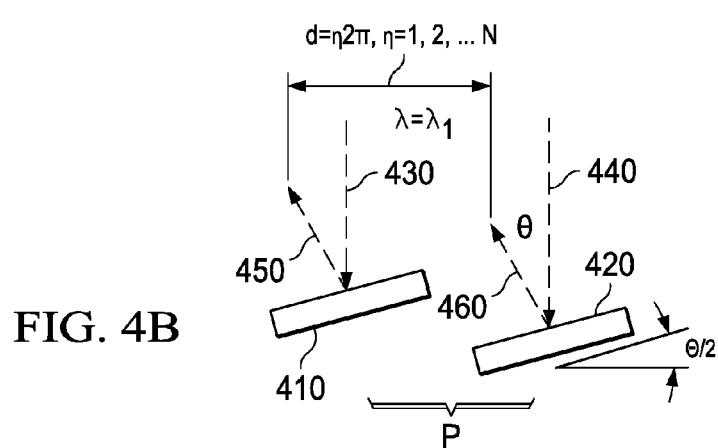

FIGS. 4A and 4B respectively illustrate a pair of mirrors 410, 420 in the DMD 120 of FIGS. 2 and 3 in untilted and tilted states reflecting light of a first wavelength. In FIG. 4A, light having (or centered about) a wavelength $\lambda_1$ is projected toward the surface of the mirrors 410, 420. Arrows 430, 440, 450, 460 indicate that the light strikes the mirrors 410, 420 at an angle normal to the mirrors 410, 420 and is accordingly back-reflected at an angle normal to the mirrors 410, 420. If θ is the angle between the arrows 430, 440 and the arrows 450, 460, called the "diffraction angle," θ=0. If d is the distance between wavefronts of the light reflected off the mirror 410 and wavefronts of the light reflected off the mirror 420 and η is an integer representing orders of diffraction peaks (i.e., of maximum constructive interference and blazing), d=η2π. Thus the wavefronts of the reflected light are in phase and constructive interference is at or near maximum; θ=$θ_η$=$θ_0$. The mirrors 410, 420 produce a blazed output for $λ=λ_1$ when the mirrors 410, 420 are untilted.

In FIG. 4B, the same light is again projected toward the surface of the mirrors 410, 420. However the mirrors 410, 420 are now tilted at an angle θ/2. Thus θ, the angle between the arrows 430, 440 and the arrows 450, 460, is greater than 0. It so happens that the pitch P and the tilt angle θ/2 of the mirrors 410, 420 are such that d=η2π. Thus the wavefronts of the reflected light are in phase and constructive interference is at or near maximum; θ=$θ_η$=$θ_1$. The mirrors 410, 420 also produce a blazed output for $λ=λ_1$ when the mirrors 410, 420 are tilted.

Figure 5A:
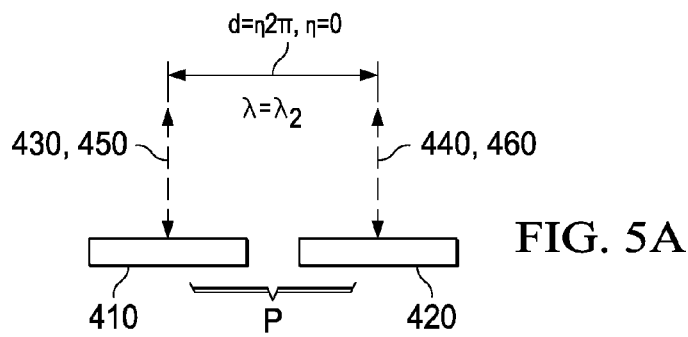
FIGS. 5A and 5B respectively illustrate the pair of mirrors of FIGS. 4A and 4B reflecting light of a second wavelength.
Figure 5B:
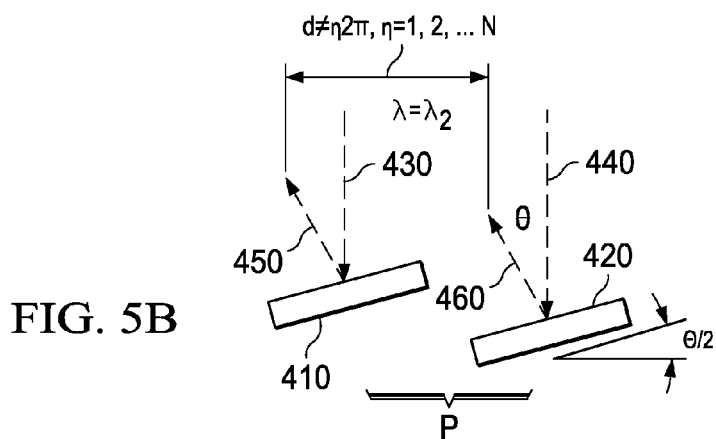

FIGS. 5A and 5B respectively illustrate the pair of mirrors 410, 420 of FIGS. 4A and 4B reflecting light of a second wavelength. In FIG. 5A, light having (or centered about) a wavelength $λ_2$ ($λ_2≠λ_1$) is projected toward the surface of the mirrors 410, 420. Arrows 430, 440, 450, 460 indicate that the light strikes the mirrors 410, 420 at an angle normal to the mirrors 410, 420 and is accordingly back-reflected at an angle normal to the mirrors 410, 420; θ=0 and d=η2π. Thus the wavefronts of the reflected light are in phase and constructive interference is at or near maximum; θ=$θ_η$=$θ_0$. The mirrors 410, 420 produce a blazed output for $λ=λ_2$ when the mirrors 410, 420 are untilted.

However, in FIG. 5B, the same light is again projected toward the surface of the mirrors 410, 420, which are tilted at an angle θ/2. Unfortunately, the pitch P and the tilt angle θ/2 of the mirrors 410, 420 are the same as they were in FIGS. 4A, 4B and 5A, meaning that d≠η2π when θ>0. Thus the wavefronts of the reflected light are at least somewhat out of phase and constructive interference is no longer near maximum; θ=$θ_η$=$θ_1$. The mirrors 410, 420 fail to produce a blazed output for $λ=λ_2$ when the mirrors 410, 420 are tilted.

Figure 6A:
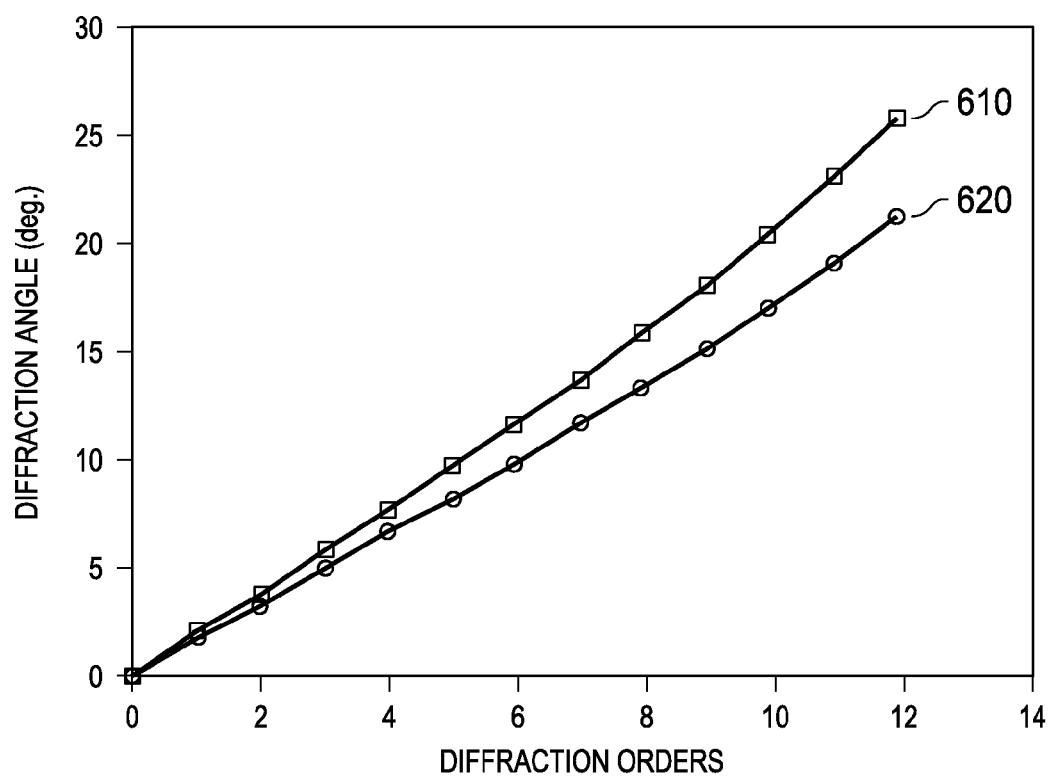
FIG. 6A is a graph plotting diffraction angle as a function of diffraction order for light of first and second wavelengths reflected by a DMD having a wavelength-independent modulation structure.
Figure 6B:
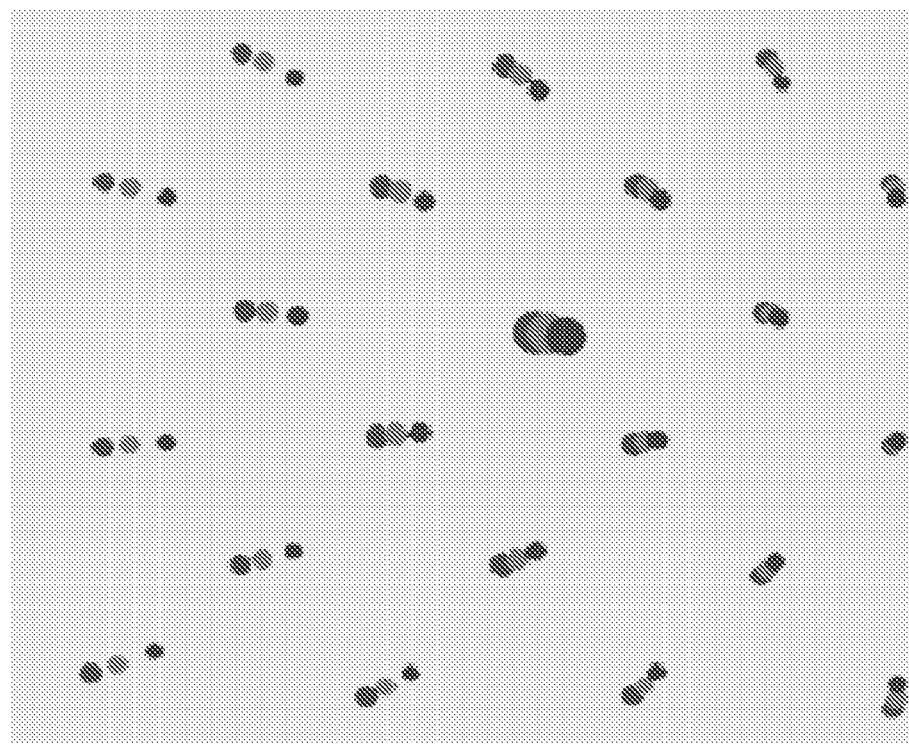
FIG. 6B is an image of a diffraction pattern corresponding to the graph of FIG. 6A.

FIG. 6A is a graph plotting diffraction angle θ as a function of diffraction order η for light of first and second wavelengths reflected by a DMD having a wavelength-independent modulation structure. A line 610 represents the first wavelength, and a line 620 represents the second wavelength. The first and second lines 610, 620 diverge from the $0^{th}$ diffraction order as one would expect. FIG. 6B is an image of a diffraction pattern corresponding to the graph of FIG. 6A. FIG. 6B illustrates that a DMD having a wavelength-independent modulation structure produces a wavelength-dependent diffraction pattern. Unreferenced diffraction peaks diverge according to color. The net result of the analysis of FIGS. 4A, 4B, 5A, 5B, 6A and 6B is that a DMD having a uniform modulation structure can fail to produce a blazed condition for multiple wavelengths of light, which can ultimately increase insertion loss.

Figure 7A:
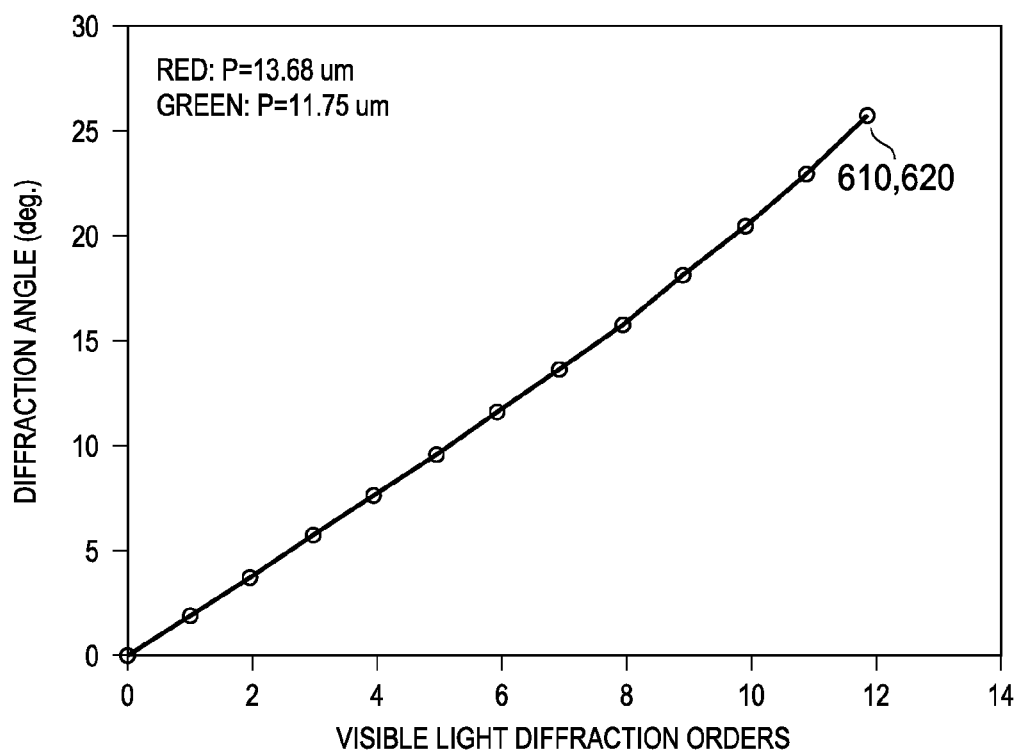
FIG. 7A is a graph plotting diffraction angle as a function of diffraction order for light of first and second wavelengths reflected by a DMD having a wavelength-dependent modulation structure.
Figure 7B:
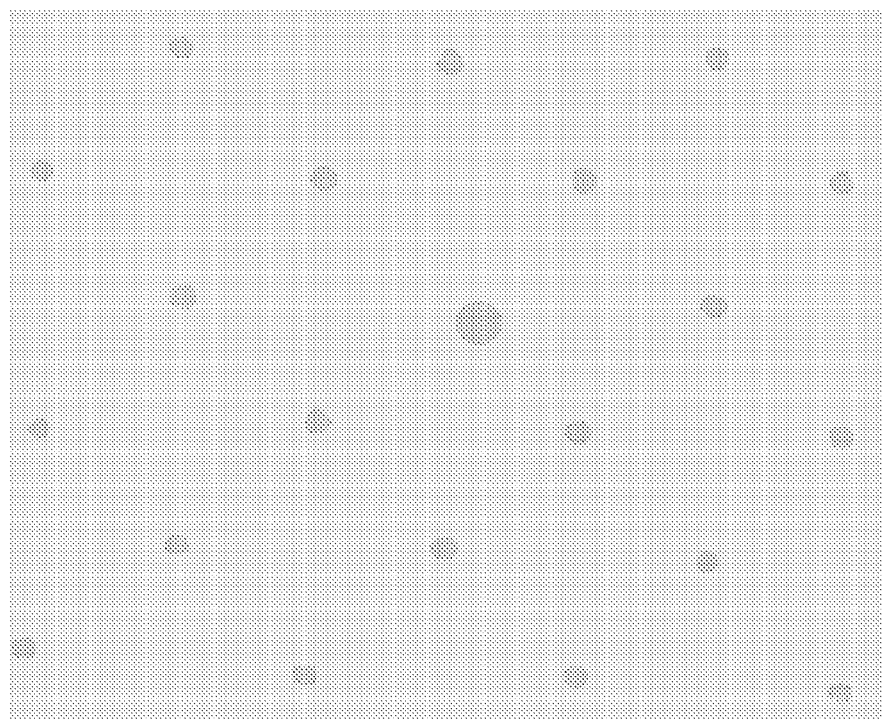
FIG. 7B is an image of a diffraction pattern corresponding to the graph of FIG. 7A.

FIG. 7A is a graph plotting diffraction angle as a function of diffraction order for light of first and second wavelengths reflected by a DMD having a wavelength-dependent modulation structure. FIG. 7A shows that the first and second lines 610, 620 substantially overlie one another as diffraction order increases. FIG. 7B is an image of a diffraction pattern corresponding to the graph of FIG. 7A and illustrates that a DMD having a wavelength-independent modulation structure can produce a wavelength-dependent diffraction pattern provided the structure bears the proper relationship to the wavelengths that the DMD is to process.

The following relationship exists between θ, η, λ and P:

$$\sin(θ_η) = ±(ηλ/P),$$

where θ, η, λ and P are as defined above. Exploiting this relationship allows a DMD to be designed having a wavelength-independent modulation structure that produces a wavelength-dependent diffraction pattern. If λ/P is constant, $θ_η$ is constant. Likewise, if λ/sin(θ/2) is constant, $θ_η$ is constant. Because DMDs may contain minor variations in pitch or tilt angle due to process variations, if λ/P is substantially constant, $θ_η$ is substantially constant. Likewise, if λ/sin(θ/2) is substantially constant, $θ_η$ is substantially constant.

Figure 8A:
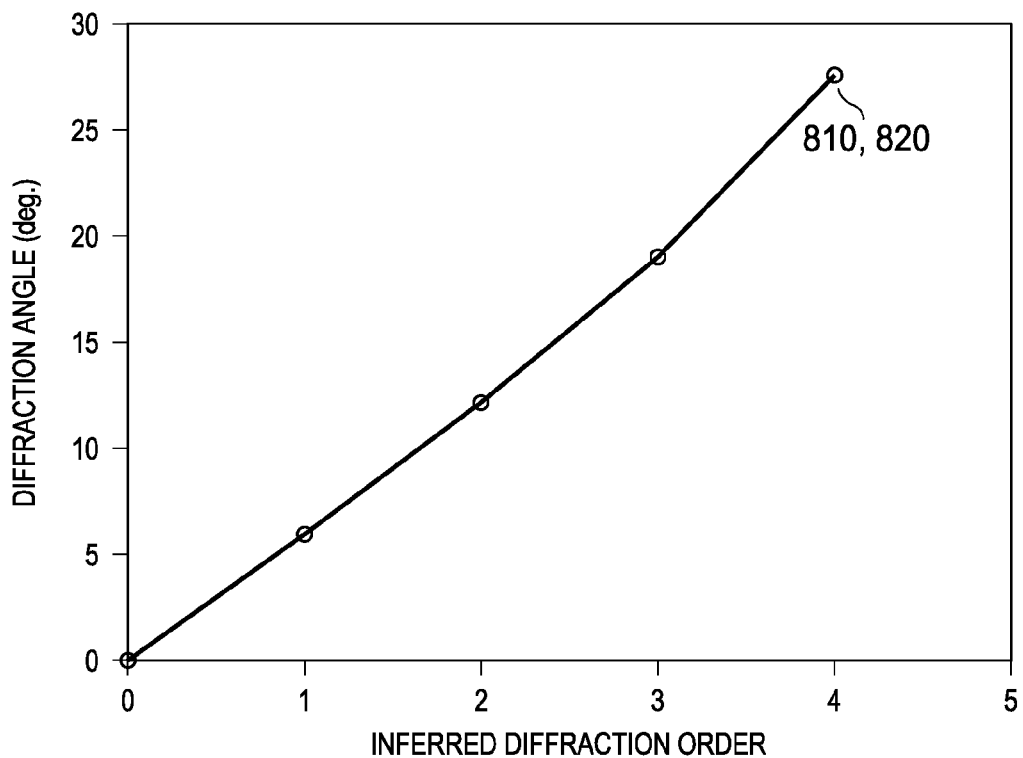
FIG. 8A is a graph plotting diffraction angle as a function of inferred diffraction order for light of first and second wavelengths reflected by a DMD having a wavelength-dependent modulation structure.
Figure 8B:
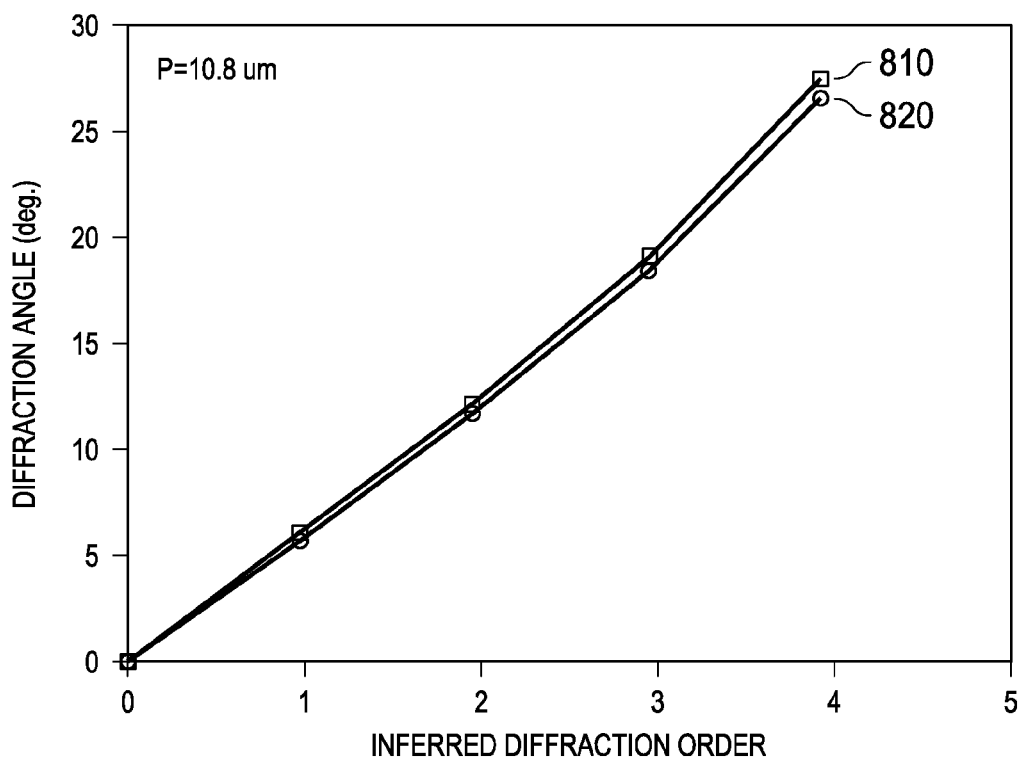
FIG. 8B is a graph plotting diffraction angle as a function of inferred diffraction order for light of first and second wavelengths reflected by a DMD having a wavelength-independent modulation structure.

FIG. 8A is a graph plotting diffraction angle as a function of inferred diffraction order for light of first and second wavelengths reflected by a DMD having a wavelength-dependent modulation structure. FIG. 8B is a graph plotting diffraction angle as a function of inferred diffraction order for light of first and second wavelengths reflected by a DMD having a wavelength-independent modulation structure. In FIG. 8A, lines 810, 820 representing diffraction angles for light having a wavelength λ=1.561 μm reflecting off a group of micromirrors having a pitch P=10.8 μm as well as for light having a wavelength λ=1.528 μm reflecting off a group of micromirrors having a pitch P=10.572 μm superpose one another. FIG. 8B contrasts the DMD of FIG. 8A with a DMD having a fixed pitch P=10.8 μm. As in FIGS. 6A and 6B, the lines 810, 820 diverge from the $0^{th}$ diffraction order. Table 1, below, sets forth the examples that FIGS. 8A and 8B plot.

TABLE 1

Example Wavelengths, Pitches and Diffraction Angles

| | | | |
|---|---|---|---|
| λ | 1.561 μm | 1.528 μm | 1.528 μm |
| P | 10.800 μm | 10.800 μm | 10.572 μm |
| $θ_0$ | 0 | 0 | 0 |
| $θ_1$ | 5.896° | 5.770° | 5.896° |
| $θ_2$ | 12.063° | 11.793° | 12.063° |
| $θ_3$ | 18.908° | 18.441° | 18.908° |
| $θ_4$ | 27.418° | 25.576° | 27.418° |

FIG. 9 is plan view of a portion of one embodiment of a DMD having a wavelength-independent modulation structure constructed according to the principles of the invention. FIG. 9 may be compared to FIG. 3. A first portion of light at (e.g., centered about) a first wavelength is projected upon a first group 320 of micromirrors that tilt along a vertical axis. Likewise, a second portion of the light at (e.g., centered about) a second wavelength that is different from the first wavelength is projected upon a second group 330 of micromirrors that tilt along a vertical axis. The first group 320 of micromirrors has a first modulation structure having a pitch that is based on the first wavelength. The second group 330 of micromirrors has a second modulation structure having a pitch that is based on the second wavelength. FIG. 9 explicitly shows that a pitch $P_{x1}$ associated with the first group 320 of micromirrors is narrower than the pitch $P_{x2}$ associated with the second group 330 of micromirrors.

Figure 10:
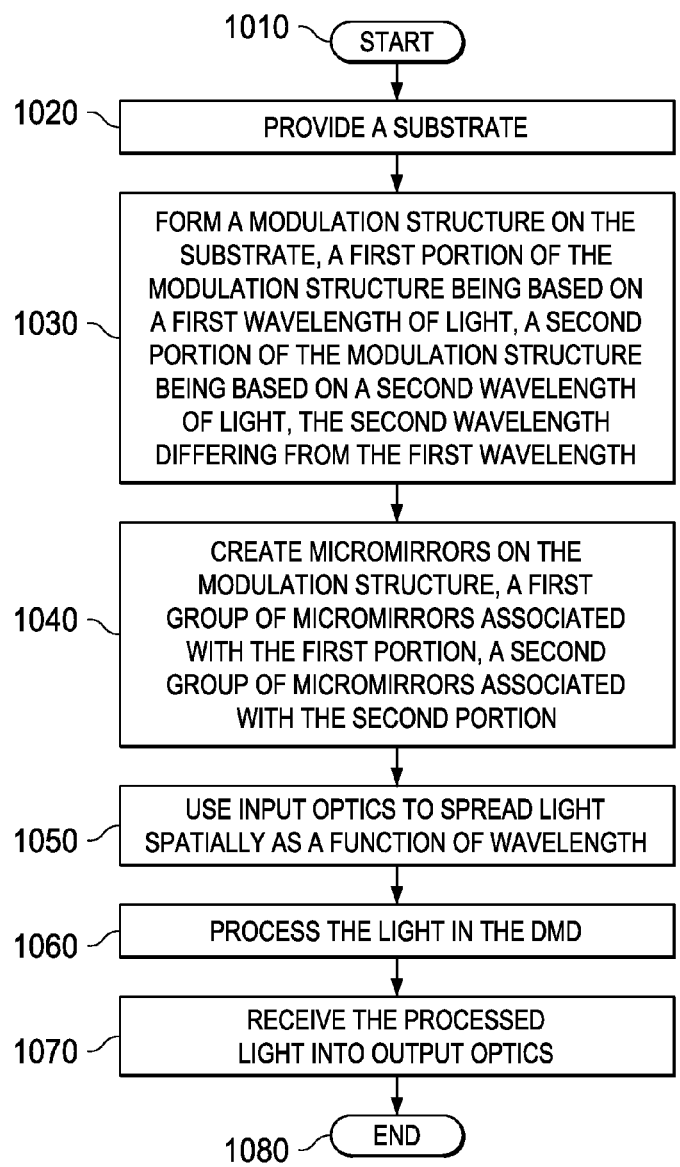
FIG. 10 is a flow diagram of one embodiment of a method of manufacturing and using a DMD carried out according to the principles of the invention.

FIG. 10 is a flow diagram of one embodiment of a method of manufacturing and using a DMD carried out according to the principles of the invention. The method begins in a start step 1010. In a step 1020, a substrate is provided. In a step 1030, a modulation structure is formed on the substrate. A first portion of the modulation structure is based on a first wavelength of light, and a second portion of the modulation structure is based on a second wavelength of light. The second wavelength differs from the first wavelength. In a step 1040, micromirrors are created on the modulation structure. A first group of micromirrors is associated with the first portion, and a second group of micromirrors is associated with the second portion. In a step 1050, input optics are used to spread light spatially as a function of wavelength. In a step 1060, the light is received by and processed with a DMD. In a step 1070, the processed light is received into output optics, where it may be recombined and transferred into an optical fiber, formed into an image or handled in any other desired manner. The method ends in an end step 1080.

Those skilled in the art to which the invention relates will appreciate that other and further additions, deletions, substitutions and modifications may be made to the described embodiments without departing from the scope of the invention.

What is claimed is:

1. A digital micromirror device, comprising:
   a first group of micromirrors defining a first modulation structure dimensioned and configured with a first pitch and tilt angle for reflecting light of a first wavelength with wavefront differences of multiples of $2\pi$ radians between incident and reflected light; and
   a second group of micromirrors defining a second modulation structure dimensioned and configured with a second pitch and tilt angle for reflecting light of a second wavelength with wavefront differences of multiples of $2\pi$ radians between incident and reflected light, said second wavelength differing from said first wavelength.

2. The device as recited in claim 1, wherein the pitch of said first group differs from the pitch of said second group.

3. The device as recited in claim 2, wherein the tilt angle of said first group differs from the tilt angle of said second group.

4. The device of claim 2, wherein a ratio of said first wavelength to said pitch of said first group is equal to a ratio of said second wavelength to said pitch of said second group.

5. The device as recited in claim 1, wherein the tilt angle of said first group differs from the tilt angle of said second group.

6. The device of claim 5, wherein a ratio of said first wavelength to a sin of said tilt angle of said first group is equal to a ration of said second wavelength to a sin of said tilt angle of said second group.

7. The device as recited in claim 1, wherein said first group and said second group include micromirrors of substantially identical size and shape.

8. The device as recited in claim 1, further comprising a third group of micromirrors defining a third modulation structure dimensioned and configured with a third pitch and tilt angle for reflecting light of a third wavelength with wavefront differences of multiples of $2\pi$ radians between incident and reflected light, said third wavelength differing from said first wavelength and said second wavelength, and said first group, said second group and said third group being substantially colinear.

9. An optical processor, comprising:
   input optics configured to receive and spatially spread light as a function of wavelength; and
   a digital micromirror device configured to receive a first portion of said light at a first wavelength upon a first group of micromirrors defining a first modulation structure dimensioned and configured with a first pitch and tilt angle for reflecting light of said first wavelength with wavefront differences of multiples of $2\pi$ radians between incident and reflected light, and to receive a second portion of said light at a second wavelength upon a second group of micromirrors defining a second modulation structure dimensioned and configured with a second pitch and tilt angle for reflecting light of said second wavelength with wavefront differences of multiples of $2\pi$ radians between incident and reflected light, said second wavelength differing from said first wavelength.

10. The processor as recited in claim 9, wherein the pitch of said first group differs from the pitch of said second group.

11. The processor as recited in claim 10, wherein the tilt angle of said first group differs from the tilt angle of said second group.

12. The device of claim 10, wherein a ratio of said first wavelength to said pitch of said first group is equal to a ratio of said second wavelength to said pitch of said second group.

13. The processor as recited in claim 9, wherein the tilt angle of said first group differs from the tilt angle of said second group.

14. The device of claim 13, wherein a ratio of said first wavelength to a sin of said tilt angle of said first group is equal to a ration of said second wavelength to a sin of said tilt angle of said second group.

15. The processor as recited in claim 9, wherein said first group and said second group include micromirrors of substantially identical size and shape.

16. The processor as recited in claim 9, wherein said digital micromirror device is further configured to receive a third portion of said light at a third wavelength upon a third group of micromirrors defining a third modulation structure dimensioned and configured with a third pitch and tilt angle for reflecting light of said third wavelength with wavefront differences of multiples of $2\pi$ radians between incident and reflected light, said third wavelength differing from said first wavelength and said second wavelength, and said first group, said second group and said third group being substantially colinear.

17. The processor as recited in claim 9, wherein said processor is part of a color image display.

18. The processor as recited in claim 9, comprising output optics configured to receive and optically recombine said at least some of the first portion and second portion.

19. The processor as recited in claim 9, wherein said processor is part of an add-drop multiplexer.

* * * * *